United States Patent
Vysochan

(10) Patent No.: US 8,677,906 B2
(45) Date of Patent: Mar. 25, 2014

(54) AUTOMATIC ADDRESS TRANSPORTATION SYSTEM

(76) Inventor: Yuriy Vysochan, Huntingdon Valley, PA (US)

(*) Notice: Subject to any disclaimer, the term of this patent is extended or adjusted under 35 U.S.C. 154(b) by 240 days.

(21) Appl. No.: 13/153,430

(22) Filed: Jun. 5, 2011

(65) Prior Publication Data

US 2012/0304885 A1 Dec. 6, 2012

(51) Int. Cl.
*E01B 7/00* (2006.01)

(52) U.S. Cl.
USPC .............. 104/130.07; 104/245; 105/215.1

(58) Field of Classification Search
USPC ............. 104/88.01, 130.07, 242, 245; 105/215.1, 215.2
See application file for complete search history.

(56) References Cited

U.S. PATENT DOCUMENTS

| | | | | |
|---|---|---|---|---|
| 3,182,513 A * | 5/1965 | Mulhaupt | ............ | 73/8 |
| 3,831,527 A * | 8/1974 | Peterson | ............ | 104/130.07 |
| 4,068,598 A * | 1/1978 | Bardet | ............ | 104/130.07 |
| 4,132,175 A * | 1/1979 | Miller et al. | ............ | 104/130.07 |
| 7,624,685 B2 * | 12/2009 | Andreasson et al. | ............ | 104/130.07 |
| 8,146,506 B2 * | 4/2012 | Stahn | ............ | 104/88.01 |
| 2006/0201376 A1 * | 9/2006 | Brigham | ............ | 104/130.07 |
| 2009/0235839 A1 * | 9/2009 | Stahn | ............ | 104/88.01 |

* cited by examiner

*Primary Examiner* — Zachary Kuhfuss
(74) *Attorney, Agent, or Firm* — Mendelsohn, Drucker & Dunleavy, P.C.; Craig M. Brown

(57) ABSTRACT

This invention is based on using the railroad system for automatic address transportation of people and cargo. This invention allows usage of existing rail roads, many miles of which are not used or partially used. This invention includes design of vehicle that will be used for automatic address transportation. The invention allows excluding the most complicated part of railroads, switches, and transforms the railroad from an active to a passive system.

8 Claims, 3 Drawing Sheets

AUTOMATIC ADDRESS TRANSPORTATION SYSTEM

BACKGROUND OF INVENTION

The present invention relates to point-to-point transportation, personal rapid transit, rail road systems, and automatic warehouse system.

Some recent systems have been realized in the form of Skyweb Express—point-to-point transportation Taxi 2000 in the USA, personal rapid transit ULTraPRT and Vectus in the United Kingdom.

Advantages of these systems include: on-demand service, non-stop travel to your destination, faster trips, less congestion, small vehicles operated without drivers, low energy use, and green transportation solution.

The issue of these systems is the great initial cost of the infrastructure network.

SUMMARY OF INVENTION

This invention is based on using the network of the existing railroad system for automatic address transportation of people and cargo. This invention reduces the costs of construction of a new track network and the time for starting the project.

This invention includes design of the vehicle that will be used for automatic address transportation (AAT). The vehicle can pass switches no matter what direction the vehicle is in. This allows for usage of the railroad system for both trains and AAT (for example: night—for trains and cargo, and day—for AAT).

This invention allows excluding the most complicated part of railroads (i.e., switches) and transform the railroad from an active system to a passive system.

Some advantages of AAT system not inherent in the specified transportation systems above are: (i) the presence of rail road network which reduces costs on construction of track networks and reduces time for starting up the project, (ii) the presence of technology, tools, (iii) the presence of a steering mechanism which allows increased maximum speed and decreased noise, and (iv) the simplicity of this innovation allows it to be used in automatic warehouse systems.

AAT system uses small vehicles which can be moved by linear induction motor and can be equipped with a regular electric motor with a battery. The battery can be used for passing segments of track that are not otherwise powered, or in an event when supplied power is lost, in order to finish the trip. Each vehicle is controlled by a local computer, which in turn is controlled by a central computer which receives information from the field. The control system is described in detail in U.S. Pat. No. 7,302,319 B2 and realized in the specified transportation systems above, therefore it will not be described in this application.

DETAILED DESCRIPTION

Figure 1A:
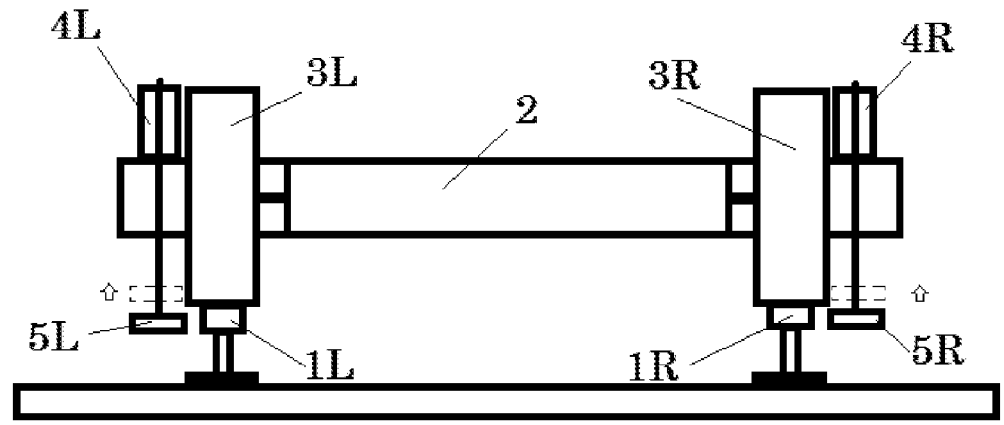
FIG. 1a shows a design of a vehicle on a track without switches.

As shown in FIG. 1(a), the body 2 has attached wheels 3 by which vehicle stands on the rail road 1. To prevent the vehicle from falling off the track, it is supported by wheels 5 and the lifting mechanism 4. Support wheels are in a lowered position, which allows the vehicle to operate on the railroad without switches.

Figure 1B:
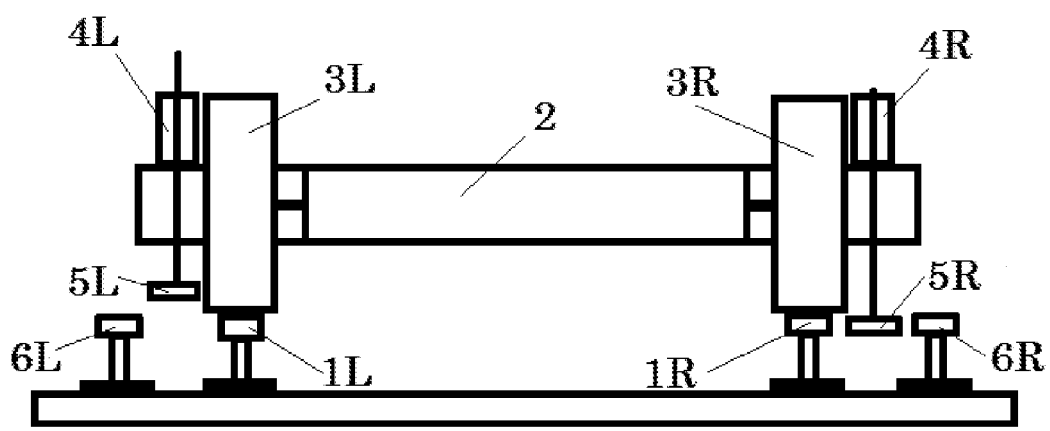
FIGS. 1b and 1c show a vehicle passing the switch.
Figure 1C:
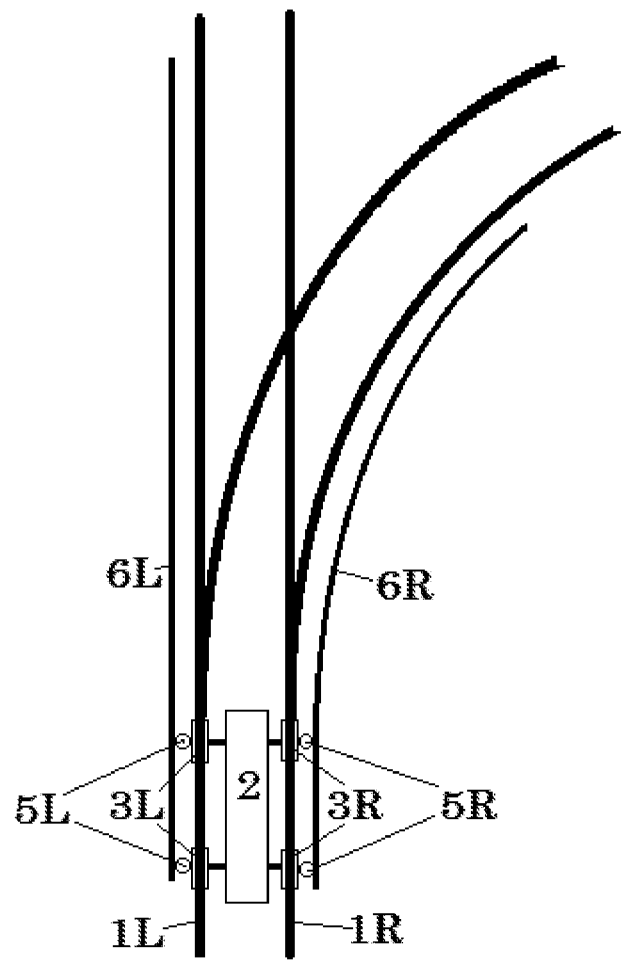

In order to pass the railroad switches, the railroad must be equipped with auxiliary rails 6L & 6R, which are needed only along a switch as seen in FIGS. 1b and 1c. In FIG. 1b, the vehicle is shown in position to make a right turn. Left support wheel, 5L, is lifted and auxiliary rail 6R prevents the vehicle from shifting down to the right side.

In order to make a left turn, right support wheel 5R is in a raised position and auxiliary rail 6L prevents the vehicle from shifting down to the left side.

The above described vehicle can make all turns only when it reaches an auxiliary rail 6 as seen in FIG. 1c. If only one support rail is present, for example a left or right road merger, the vehicle can make a turn along the side on which the auxiliary rail installed. When the vehicle is leaving a ramification zone, the support wheels must be in the lowered position.

Figure 2:
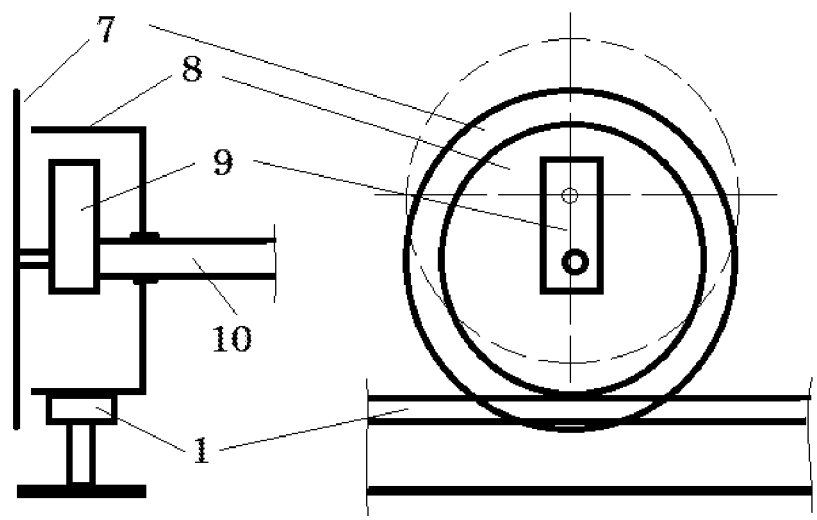
FIG. 2 shows vehicle wheels with rising rims.

Instead of support wheels, each wheel 8 can be made with rising rim 7, which holds the vehicle on the rails 1 as seen in FIG. 2. Rim 7 is attached to axle 10 by hoist 9. Wheel 8 spins on axle 10.

When the vehicle is moving on a railroad without ramification, rim 7 is located in a central position. To pass the ramification zone or railroad switch, hoist 9 lifts rim 7 over the rail in a raised position as shown in FIG. 2 by the dashed line.

Figure 3:
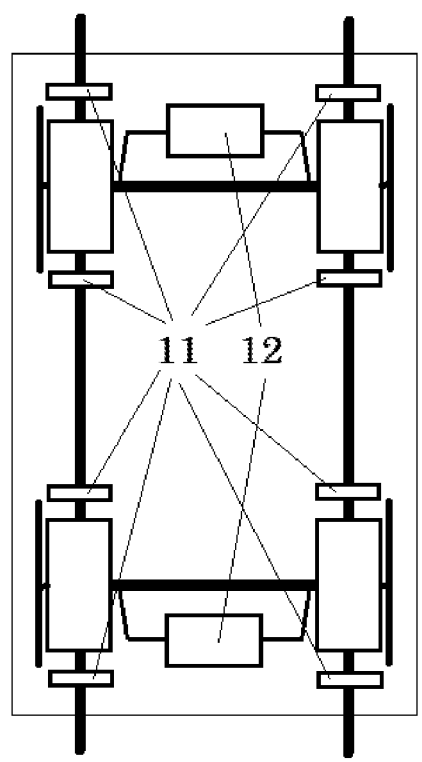
FIG. 3 shows a structure of a steering mechanism.

To increase maximum speed and decrease noise, the vehicle can be equipped with a steering mechanism (SM) as seen in FIG. 3. Its purpose is to hold the vehicle in the middle of the railroad, so that the support wheels or rims do not touch the rails. Support wheels or rims are only for emergencies (slippery road, strong wind). The SM consists of a set of sensors 11 and actuators 12. Sensors 11 define the location of the vehicle relative to the rail and create commands for actuators in order to correct deviation from the middle of the railroad.

What is claimed is:
1. A vehicle configured for use on rails of an existing railroad network, the vehicle comprising:
 a body;
 first and second wheels connected to the body, wherein:
  the first and second wheels are spaced apart such that the vehicle is configured to stand on the rails of the existing railroad network; and
  each wheel is configured without a flange attached thereto that extends below a bottom of the wheel;
 a first support wheel corresponding to the first wheel; and
 a second support wheel corresponding to the second wheel, wherein each of the first and second support wheels are selectively configurable to operate in (i) a lowered position, wherein the support wheel extends below the bottom of the corresponding wheel and adjacent to one of the rails, and (ii) a raised position, wherein the support wheel does not extend below the bottom of the corresponding wheel, wherein:
  an axis of each of the first and second support wheels is substantially perpendicular to an axis of the first and second wheels; and
  when the vehicle approaches a junction of the railroad network and one of the first and second support wheels is in the lowered position, the support wheel is guided between a space separating (i) a rail of the existing railroad network and (ii) an auxiliary rail positioned adjacent to the rail.

2. The vehicle of claim 1, wherein, when the first and second support wheels are operated in the lowered position, the vehicle is prevented from leaving the rails.

3. The vehicle of claim 1, wherein:
in a first configuration, the first support wheel is operated in the lowered position and the second support wheel is operated in the raised position to support turning of the vehicle towards a first direction; and
in a second configuration, the first support wheel is operated in the raised position and the second support wheel is operated in the lowered position to support turning of the vehicle towards a second direction, different from the first direction.

4. The vehicle of claim 3, wherein the first direction is towards the first wheel and the second direction is towards the second wheel.

5. The vehicle of claim 1, wherein the vehicle further comprises a steering mechanism configured to keep the vehicle on the rails.

6. A transportation system comprising:
an existing network of railroad rails comprising a first rail and a second rail;
first and second auxiliary rails positioned at a junction of the network and adjacent to the first and second rails, respectively; and
a vehicle configured to travel over the existing network of railroad rails comprising:
first and second wheels;
a first support wheel corresponding to the first wheel of the vehicle; and
a second support wheel corresponding to the second wheel of the vehicle, wherein:
each of the first and second support wheels are selectively configurable to operate in (i) a lowered position, wherein the support wheel extends below a bottom of the corresponding wheel and adjacent to one of the rails, and (ii) a raised position, wherein the support wheel does not extend below a bottom of the corresponding wheel; and
when the vehicle approaches the junction and one of the first and second support wheels is in the lowered position, the support wheel is guided between a space separating (i) one of the first and second rails and (ii) a corresponding one of the first and second auxiliary rails, wherein, when the vehicle is not at the junction, the first and second support wheels are operated in the lowered position such that the vehicle is prevented from leaving the rails.

7. The transportation system of claim 6, wherein:
in a first configuration, the first support wheel is operated in the lowered position and the second support wheel is operated in the raised position to support turning of the vehicle towards a first direction; and
in a second configuration, the first support wheel is operated in the raised position and the second support wheel is operated in the lowered position to support turning of the vehicle towards a second direction, different from the first direction.

8. The transportation system of claim 7, wherein the first direction is towards the first wheel and the second direction is towards the second wheel.

* * * * *